United States Patent
Madec et al.

(10) Patent No.: US 6,413,585 B1
(45) Date of Patent: Jul. 2, 2002

(54) THERMOCHEMICAL TREATMENT, IN HALOGENATED ATMOSPHERE, OF A CARBON-CONTAINING MATERIAL

(75) Inventors: Yves Madec; Lionel Vandenbulcke, both of Orleans; Christian Robin-Brosse, Le Haillan; Jacques Thebault, Bordeaux; Stéphane Goujard, Merignac, all of (FR)

(73) Assignee: Societe Nationale d'Etude et de Construction de Moteurs d'Aviation - S.N.E.C.M.A., Paris (FR)

( * ) Notice: Subject to any disclaimer, the term of this patent is extended or adjusted under 35 U.S.C. 154(b) by 0 days.

(21) Appl. No.: 09/284,808
(22) PCT Filed: Oct. 22, 1997
(86) PCT No.: PCT/FR97/01890
  § 371 (c)(1),
  (2), (4) Date: Apr. 21, 1999
(87) PCT Pub. No.: WO98/17602
  PCT Pub. Date: Apr. 30, 1998

(30) Foreign Application Priority Data

Oct. 22, 1996 (FR) ............................................. 96 12842

(51) Int. Cl.$^7$ .............................................. C23C 16/32
(52) U.S. Cl. ............... 427/253; 427/248.4; 427/249.16; 427/249.17
(58) Field of Search ....................... 427/249.15, 249.16, 427/252, 249.1, 249.3, 249.5, 253, 247.17, 249.4

(56) References Cited

U.S. PATENT DOCUMENTS

| | | | |
|---|---|---|---|
| 3,579,373 A | | 5/1971 | Pingel |
| 4,472,476 A | * | 9/1984 | Veltri et al. .................. 428/215 |
| 4,476,164 A | * | 10/1984 | Veltri et al. .................. 427/249 |
| 4,487,799 A | * | 12/1984 | Galasso et al. ............. 428/334 |
| 5,209,950 A | * | 5/1993 | Schwartz et al. ............ 427/252 |
| 5,284,685 A | * | 2/1994 | Rousseau ............... 427/249.15 |
| 5,360,638 A | * | 11/1994 | Lequertier .................. 427/257 |
| 5,418,012 A | * | 5/1995 | Kung .................... 427/249.18 |

FOREIGN PATENT DOCUMENTS

| | | |
|---|---|---|
| FR | 2 304 590 | 10/1976 |
| FR | 2 576 917 | 8/1986 |

* cited by examiner

Primary Examiner—Bret Chen
(74) Attorney, Agent, or Firm—Weingarten, Schurgin, Gagnebin & Lebovici LLP

(57) ABSTRACT

The invention concerns (1) thermochemically treating by pack-cementation a carbon-containing material, which may have an open porosity, to generate a refractory carbide coating on its surface and, if the material is porous, within the material; and (2) the use of specific alloys as a pack for thermochemically treating carbon-containing materials, optionally with an open porosity, in a halogenated atmosphere. Pack-cementation is carried out under reduced pressure using an element E (to be transported and to be reacted with the carbon in the material to generate the expected carbide) alloyed to an element M, and using a halide (chloride or fluoride, preferably a fluoride) of the same element M, of low volatility, present in the solid form.

11 Claims, No Drawings

THERMOCHEMICAL TREATMENT, IN HALOGENATED ATMOSPHERE, OF A CARBON-CONTAINING MATERIAL

The present invention relates to:
- thermochemically treating a carbon-containing material which can optionally have an open porosity, to generate a refractory carbide coating on the surface and within said material if it is porous, by pack-cementation (carbiding);
- the use of specific alloys as a pack (cement) to thermochemically treat carbon-containing materials, which may optionally have an open porosity, in a halogenated atmosphere.

In a first aspect, the present invention proposes an efficient method of generating refractory carbide coatings on the external, and on the internal surfaces when they exist and are accessible, of carbon-containing materials. Forming this type of coating is of great importance in numerous fields since such coatings endow such carbon-containing materials with high resistance to wear, ablation, erosion, oxidation, and corrosion. Such coatings can also protect such carbon-containing materials from the diffusion of elements within them. Said coatings can also improve the moistening of carbon-containing materials by molten metals. In particular, the method of the invention has been developed for producing particularly effective thermal shields and barriers to diffusion.

The method of the invention is a pack-cementation (carbiding) method: it generates a refractory carbide on the surface (surface=external surface+, possibly, the internal surface) of a carbon-containing material from the carbon C of said heat treated material and from an element E supplied in the form of a pack (cement) in the reaction medium and transported in the form of a halide to the surface of said carbon-containing material. Said method of the invention jointly uses an E—M type donor pack alloy (more precisely xE-yM-zM') and a solid activating compound with formula $MX_n$; under conditions, notably of pressure, in which said element E can be transported (where compound $MX_n$ is sufficiently stable for halides $MX_n$, in the solid and gas forms, to coexist with $EX_n$, in the gas form). Said conditions and the nature of elements E, M, M', X are defined below.

A pack-cementation method has already been described in French patent application FR-A-2 304 590. That method consists of treating the carbon-containing material to generate a coating of a carbide of a refractory metal at its surface:
- at a temperature in the range 850° C. to 1250° C.;
- at atmospheric pressure, in a hydrogen-containing atmosphere;
- in the presence of a pack powder comprising an intimate mixture of the refractory metal (Ti, Zr, Hf, Ta, Nb) and a halide of that refractory metal ($TiCl_4$, $ZrCl_4$, etc.) or a halide which, in situ, can generate the halide of that refractory metal (ammonium halides (volatile), or cobalt, nickel, iron, or aluminium halides).

That method is carried out using the material to be coated in contact with (in) the pack powder which comprises a refractory diluent (alumina, magnesia) and chromium (catalyst), in addition to the refractory metal and the halide of that refractory metal, or a precursor thereof.

In the prior art method, the refractory metal (E) is transported by its own halide ($EX_n$), introduced directly or generated in situ from a precursor of that halide ($M'X_n$) of which the halogen is displaced (precursor $M'X_n$ does not remain solid, it is only used to generate $EX_n$).

The method of the invention can be analyzed as an improvement over, or an optimization of, that prior art method. The method of the invention produces very good results with a very large range of carbon-containing materials which are non porous, or slightly porous, or even very porous (the prior art method does not enable suitable coatings to be produced in the internal portions of the treated parts, in the pores of such parts . . . the thickness of the deposit is observed to be non uniform, in particular because diffusion in the gas phase is too slow) and with a larger range of elements E including metalloids such as boron and silicon, in addition to metals such as titanium, zirconium, hafnium, tantalum, niobium and chromium. The very good results obtained with boron in particular should be mentioned. It should also be noted incidentally that the commercially available packs recommended for boriding steels do not enable boron to be transported to the surface of carbon-containing materials.

The prior art also describes the production of coatings in the internal and external portions of metal parts, by suppling a metal such as aluminium (FR-A-2 576 916 and FR-A-2 576 917). The method described in FR-A-2 576 916 employs a gas phase flowing between the inlet and outlet of a reactor. To transport the supplying metal (E), the method described in FR-A-2 576 917 uses a solid halide of that supplying metal ($EX_n=AlF_3$, $CrF_2$ or $CrCl_2$) or a solid alkali halide (NaX, KX, for example) (in contrast to the method of the present invention which uses a halide of a metal M alloyed to E, of the type $MX_n$). In any case, the methods of FR-A-2 576 916 and FR-A-2 576 917 were developed in a completely different context to that of the present invention. Those methods generate coatings which are not carbides. Generation of those coatings does not use carbon migration within the treated material.

The present invention proposes an efficient method of thermochemically treating non porous, slightly porous or even highly porous carbon-containing materials (in other words, carbon-containing materials which may optionally have open porosity) in a halogenated atmosphere (pack-cementation) to generate refractory carbide coatings at the surface of said materials (surface=external surface+ optionally internal surface). Said method can produce coatings with a morphology that is regular (particularly in terms of thickness and nature of the phases) which in the case of porous materials can be measured in terms of uniformity (the ratio, expressed as a %, between the thickness of the coating over the central zone of the treated material and the thickness of the coating on the external surface of said treated material). Said method, controlled, can generate coatings with uniformity of more than 70% in some types of carbon-containing materials with a large open porosity. Such results could not be obtained using the methods of the prior art, where the uniformity of the coatings hardly ever exceed 10%.

The method of the invention comprises maintaining the carbon-containing material:
a) at a temperature in the range 700° C. to 1300° C.;
b) at a reduced pressure, in the range 0.1 kPa to 30 kPa, of hydrogen, a rare gas or a mixture of such gases;
c) in the presence of a donor pack constituted by at least one element E selected from titanium, zirconium, hafnium, tantalum, niobium, chromium, silicon, and boron, alloyed to an element M selected from aluminium, calcium, chromium, yttrium, and magnesium, and optionally alloyed to a moderator element M'; said moderator element M' being necessarily used if E=M=Cr and then being other than chromium;

and a solid activating compound of low volatility at said treatment temperature, with formula $MX_n$, where X consists of chlorine or fluorine, advantageously fluorine (and n, a whole number, corresponds to the valency of element M).

According to the invention, pack-cementation is carried out at reduced pressure using element E (to be transported and to react with the carbon of the material to generate the expected carbide) alloyed to an element M, on the one hand and a halide (chloride or fluoride, preferably fluoride) of the same element M, of low volatility, present in the solid form, on the other hand.

The pack used contains at least one element E alloyed with an element M. Said pack generally contains a single element E but a plurality of elements is not excluded. It is recommended that boron and silicon are used jointly, to generate a coating constituted by the carbides of these two elements, endowing the treated material with improved resistance to oxidation over a wider temperature range than that provided by a boron carbide. Said pack is generally a binary E—M type alloy. It can consist of an E—M—M' type alloy if a moderator element M' is used to fix the activity of said elements E and M in said pack. Said pack is advantageously produced prior to carrying out the thermochemical treatment, at atmospheric pressure, in conventional manner. This is not compulsory, however.

In any case, to generate a carbide of an element E on the surface of a carbon-containing material accordance with the invention, a suitable element M must first be selected and, if necessary, so must an element M'. Said element M is selected if a suitable halide $MX_n$ exists (solid, of low volatility at the treatment temperature). The nature of elements E and M being fixed (E≠M), binary E—M alloys can then be considered. If any exist within which the respective activities of elements E and M enable transport and liberation of said element E on the surface (external and possibly internal) of the treated material, then a priori a moderator element M' is not required. If not, a moderator element M' is recommended and thus an E—M—M' type pack.

The moderator element M' is in general a metal, advantageously selected from iron, nickel, chromium, cobalt, molybdenum, and tungsten.

Clearly, if E=Cr, then M≠Cr, or if E=M=Cr, then M'≠Cr.

Surprisingly, using the elements listed above and summarized below:

E=Ti, Zr, Hf, Ta, Nb, Cr, Si, B and alloys thereof;

M=Al, Ca, Cr, Y, Mg;

M'=Fe, Ni, Cr, Co, Mo, W;

(it being understood that if E≠M, M' may or may not be used and if E=M=Cr, then M' is used and M'≠Cr);

X=Cl or F ($MX_n$ remaining solid at the treatment temperature);

it is possible, within the context of the invention, to prepare suitable packs and activating compounds to effectively treat carbon-containing materials by carrying out a pack-cementation method (carbiding method) under the following conditions:

at a temperature in the range 700° C. to 1300° C.;

at a reduced pressure, in the range 0.1 kPa to 30 kPa, of hydrogen, a rare gas or a mixture of these gases.

The treatment temperature, in the range 700° C. to 1300° C., is generally less than 1050° C. to obtain coatings of carbides of elements E other than boron, but more than 1100° C., advantageously more than 1200° C., to obtain boron carbide coatings.

It should be remembered that, in accordance with the invention, at said treatment temperature the halogenated activating compound $MX_n$ remains solid, in a condensed form (throughout the treatment period). It has a low vapor pressure at the treatment temperature; in any case, the vapor pressure is lower than the pressure at which the method is carried out.

Given that all of the chlorides of a given element are both less stable and more volatile than the fluorides, and that said chlorides also have lower melting points than those of the corresponding fluorides, it should be understood that the halogenated activating compound used in the method of the invention is advantageously a fluoride ($MF_n$).

Said halogenated activating compound $MX_n$ is used in a quantity which is sufficient for it to subsist in the solid state, when all of the halides have been generated. Advantageously, an excess or even a large excess is used. Thus, by way of illustration, said halogenated activating compound can generally be used in an amount of about 5% by weight with respect to the weight of the pack.

The method of the invention is carried out at low pressure of a protective gas.

The protective gas is used to prevent any oxidation, to confine the reaction medium, and to set the total pressure at that at which the treatment is carried out. Said value is theoretically selected so as to be much higher than the sum of the partial pressures of the halogenated gaseous species, such that they are confined in the treatment chamber. As indicated above, said value is in the range 0.1 kPa to 30 kPa. It is advantageously in the range 0.5 kPa to 15 kPa, more advantageously again in the range 0.5 kPa to 5 kPa. When operating below 0.1 kPa or above 30 kPa, diffusion problems mean that it is difficult to produce suitable coatings, in particular within porous carbon-containing materials.

The protective gas, which must enable element E to be liberated on the surface of the treated materials, can consist of:

a rare gas such as helium or argon. These two light rare gases are particularly preferred. In particular, it is recommended that helium be used, since this gas is the lightest, and can thus accelerate diffusion in the gas phase;

a reducing gas, such as hydrogen. The supplemental reduction reactions which can be made possible by the use of such a gas may be useful;

a mixture of these gases: a rare gas, such as helium or argon, and a reducing gas such as hydrogen.

Regarding the duration of the thermochemical treatment of the invention, it can clearly be varied and is generally in the range from a few hours to a few tens of hours. It clearly depends on the desired thickness of the carbide coating and on the difficulties of infiltration into the porous materials. The method of the invention can produce coatings with a thickness which can vary from a few manometers to a few tens of microns.

The method of the invention, the essential features of which are described above and for which advantageous variations are developed below, is suitable for treating any type of carbon-containing materials. The term "carbon-containing material" as used in the present description and in the accompanying claims means materials comprising more than 25 atomic % of carbon; said carbon can be free or combined, in particular in the form of a hemi-carbide such as SiC.

It should be remembered that a portion of the carbon in said carbon-containing material when treated in accordance with the invention, is used to generate the carbide coating (in this regard, the method of the invention is a cementation method which is very different from a CVD or CVI type method) and that the method of the invention is suitable for treating non porous, slightly porous, or highly porous carbon-containing materials. More precisely, the method of the invention is suitable for treating both non porous materials and materials with an open porosity in the range 2% to 98%, generally in the range 5% to 80%. It is particularly suitable for treating:

graphite parts, which are non porous or which have an open porosity generally in the range 2% to 15%;

carbon/carbon composite materials, which have been completely or partially densified, with an open porosity generally in the range 5% to 15%; (on that type of materials which are relatively densified material, the invention principally aims to generate a superficial coating which may be quite thick).

fibrous preforms with a large open porosity, generally in the range 60% to 80%, and in particular non densified fibrous carbon preforms or non densified SiC fiber based fibrous preforms (Nicalon® or the like), pre-treated to have a superficial carbon layer, or not pre-treated; (on that type of non densified material, the invention generally aims to form a thin sheath over the fibers such that the mechanical properties of those fibers are modified only slightly);

carbon foams of very low density with an open porosity generally in the range 50% to 98%;

(on that last type of very porous carbon-containing material, the invention can produce homogeneous deposits in the core of the foam. This thus produces a low density heat insulating material with good mechanical properties at high temperatures).

Whatever the treated carbon-containing substrate, at any stage of the manufacture, the carbide layer generated increases the hardness, reinforces the resistance to oxidation and to chemical corrosion, constitutes a barrier to diffusion, in particular against oxygen, etc.

The method of the invention as defined above can be carried out in a number of variations.

Regarding the relative disposition of the reactants—treated carbon-containing material, pack, activating compound—it should be noted that:

The treated carbon-containing material can be at least partially immersed in the pack or maintained in the gas phase in a zone close to said pack. Non porous or slightly porous materials are advantageously treated using said materials disposed in the pack (such a material/pack contact does not cause a problem of said pack adhering to said material under the implementation conditions of the method, and thus does not require a severe post-treatment to remove the treated material from said pack) while treating porous or highly porous materials is advantageously carried out with said materials being maintained in the gas phase (without contact with the pack). In a further variation of the method of the invention, the pack is used in the form of a slip, which is applied to the surface of the material to be treated. More precisely, the following can be carried out:

firstly, a powdered pack is produced;

then a suspension of said powdered pack is prepared using a solvent (for example water) and possibly a fugitive binder (for example polyvinyl alcohol);

the prepared slip is applied (for example by painting) to the surface of the carbon-containing material to be treated (over all of its surface or only to a portion thereof);

the material which is at least partially coated with said slip is thermochemically treated in accordance with the invention.

After cooling, the carbon-containing material has been transformed at its surface and at depth in its subjacent porosity (if it exists).

In particular, parts such as aircraft brake disks of carbon/carbon composite can be treated to protect them against corrosion at least locally (on their friction surfaces in respect of the brake disks). The carbide layer generated can also be used as a bonding sub-layer for a further protective layer;

The solid activating compound is advantageously not in direct contact, either with the pack or with the carbon-containing material. In a particularly preferred variation, it is maintained at a distance from the pack/carbon-containing material ensemble at a temperature 20° C. to 200° C. lower, more commonly 50° C. to 100° C. lower than the temperature at which said carbon-containing material is treated (temperature of the pack/carbon-containing material combination). Thus the risks of re-condensation of the activating compound $MX_n$ on the surface of the treated material are minimized. Carrying out the method of the invention at a single given activating compound/pack contact temperature is not completely excluded, in particular when treating non porous or slightly porous materials with relatively volatile halides, but the inventors have learned that the best results, in particular with porous materials, are obtained when said activating compound, which is of low volatility, is maintained in the solid state, in a zone which is at a temperature $\theta_A$, while the pack/carbon-containing material ensemble (said carbon-containing material generally being at least partially in said pack or in the gas phase in a zone very close thereto) is maintained in a further zone at a temperature $\theta_C$: $\theta_C > \theta_A$. The temperature difference, $\Delta\theta = \theta_C - \theta_A$ can, as is recommended, be relatively high. Thus such differences in temperatures, of more than 100° C., are recommended for generating boron carbide coatings of substantial thickness. This preferred variation for the method of the invention with a thermal gradient, in which the solid activating compound is maintained in a zone which is "cold" with respect to the "hot" zone in which the carbon-containing material (and pack) is treated, is particularly original.

The method of the invention as described above is carried out using a donor pack: an E—M type or E—M—M' type alloy. It is a true alloy, and is in no way a simple mixture of powders. The alloy may have been produced prior to carrying out the method of the invention, completely independently thereof. It can thus result from a known thermochemical treatment of powders (E, M, optionally M') or from dividing a metallurgical alloy (obtained by a conventional metallurgical method) into particles with a large specific surface area. In a further variation, said alloy can be produced, when carrying out the method of the invention, in the apparatus provided for the method, prior to or as an integral part of said method, in the presence of an activating compound. In the first case, a mixture of suitable powders comprising said activating compound is heat treated at atmospheric pressure. In the second, the method of the invention is commenced (at a reduced pressure) in the presence of a mixture of powder and the activating compound (said mixture of powders being transformed into an alloy as the temperature rises).

In general, the donor pack necessary to carry out the method of the invention is advantageously produced prior to carrying out said method, at atmospheric pressure either by a thermochemical treatment carried out in the presence of a activating compound (treatment independent of or prior to the thermochemical treatment of the invention), or by a metallurgical type treatment followed by dividing the alloy obtained (treatment independent of the thermochemical treatment of the invention).

In a particularly preferred variation, said pack is produced prior to the treatment of the invention in an apparatus comprising a hot zone and a cold zone, the powders: E, M, optionally M' and $MX_n$, being mixed in the hot zone and the halogenated activating compound $MX_n$ then being recovered condensed in the cold zone.

At the end of the method of the invention—which end depends on the aim, i.e., the production of a given thickness of carbide layer(s)—with certain donor elements E such as tantalum, niobium and chromium, it is possible to obtain a plurality of carbides in a multi-phase coating. Such multi-phase coatings are important per se. It may nevertheless be opportune to subject the carbon-containing materials coated with said multi-phase coatings to a complementary heat treatment to transform them into the corresponding mono-phase carbides; in principal, these mono-phase carbides are more refractory.

Such annealing heat treatments, which can be qualified as diffusion treatments, are familiar to the skilled person. They are carried out at atmospheric pressure in the absence of any halogenated activating agent. Thus it is possible to treat carbon-containing materials which have been coated with a two-phase $TaC+Ta_2C$ coating at a temperature of close to 1300° C. after the thermochemical treatment of the invention to transform said two-phase coating into a mono-phase TaC coating.

Said TaC carbide is known to be the most refractory of carbides; coatings of this carbide are among the most effective as a diffusion barrier.

The method of the invention as described above and illustrated below is advantageously carried out under the following conditions to generate coatings of zirconium carbide, tantalum carbide, or boron carbide.

Zirconium Carbide Coatings

Advantageously, the temperature is less than 1050° C., generally in the range 800° C. to 1000° C., at a reduced pressure of a rare gas selected from helium and argon and advantageously consisting of helium, in the presence of a Zr—Al donor pack and an $AlF_3$ activating compound. The rare gas is preferred to hydrogen as it has been experimentally established that with said rare gas, uniform coatings with a regular morphology are obtained. Irregular morphologies (a "scaly" surface) are obtained at the core of preforms treated in hydrogen and can be damaged during subsequent densification thereof.

Tantalum Carbide Coating

The temperature is advantageously less than 1050° C., generally in the range 700° C. to 1000° C., at a reduced hydrogen pressure in the presence of a Ta—Cr donor pack and a $CrF_2$ activating compound. In this case, the involvement of a reducing gas is highly beneficial. As described above, the carbide obtained after such a thermochemical treatment is two-phase ($TaC+Ta_2C$); it is optionally annealed to convert it into a mono-phase tantalum carbide (TaC) coating.

Boron Carbide Coating

The temperature is advantageously more than 1100° C., generally in the range 1200° C. to 1300° C., with a reduced hydrogen pressure, in the presence of a B—Mg or B—Y donor pack and a $MgF_2$ or $YF_3$ activating compound ($MgF_2$ being combined with B—Mg and $YF_3$ with B—Y). In this context, the use of a reducing gas is also highly beneficial, particularly when yttrium is used.

The good results obtained in the present invention with boron are, as already pointed out, of special importance. They are relatively unexpected, especially due to the fact that the electropositive nature of the element boron is a priori insufficient.

The variations for the method of the invention described above for the elements E=Zr, Ta or B are advantageously carried out using the activating compound at a lower temperature than the temperature at which the carbon-containing material (and the pack) is treated, particularly when treating porous carbon-containing materials.

The present invention also provides an apparatus for carrying out the thermochemical treatment of the invention as described above. The apparatus comprises:

a first, partially sealed, chamber in which the reactants are placed and in which they react; said first chamber is advantageously formed from stainless steel or graphite;

a second chamber, in which said first chamber is located; said second chamber is sealed against the ambient atmosphere and is associated with means for circulating within it hydrogen, a rare gas or a mixture of these gases at a reduced pressure;

heating means to maintain and control the treatment within said chambers; said heating means advantageously being capable of maintaining a temperature difference of 20° C. to 200° C. between two zones in said first chamber.

The ensemble comprising the material to be treated, the donor pack and the activating compound is intended to be placed in said first chamber. It is recommended that the method be carried out in a first graphite chamber when the presence of iron in the reaction medium is to be avoided and/or when it is operated at high temperatures, for example to produce boron carbide. When free of these constraints, it is recommended that the method be carried out in a first chamber of stainless steel. Said first chamber is kept partially sealed, generally using a plug, such that the reactive atmosphere is confined within it. Thus when carrying out the method, a regime which is close to thermodynamic equilibrium can be established between the gas phase and the pack, and between said pack and the carbon-containing substrate; if the method is limited by solid phase diffusion, this is extremely desirable.

The first chamber can advantageously be provided with means for maintaining the material to be treated close to the pack without coming into contact therewith and with boat type means to contain the halogenated activating compound at a distance. With such means, physical separation of the treated carbon-containing material/pack and, if desired, physical separation of the treated carbon-containing material/pack/halogenated activating compound is ensured. This latter physical separation is advantageously combined, as described above, with suitable heating means which can maintain a temperature difference between the zones where are localized on the one hand the treated carbon-containing material/pack (mixed or physically separated) and on the other hand the halogenated activating agent.

The partially sealed first chamber is located in a second chamber which is sealed from the exterior and in which a gas is circulated (hydrogen, a rare gas, such as argon or helium or a mixture of these gases) under reduced pressure.

Said first and second chambers are associated with heating means which can heat and maintain the treatment temperature required within. As already defined above, the heating means are advantageously capable of maintaining and controlling a temperature gradient between a cold zone where the halogenated activating compound is located and a hot zone where the pack and the carbon-containing material to be treated are located, either mixed together or physical separated.

In a variation, said first and second chambers are located in a furnace with cylindrical geometry.

The invention also generally concerns the use of an alloy with formula:

where:
- E is selected from Ti, Zr, Hf, Ta, Nb, Cr, Si, B and alloys thereof;
- M is selected from Al, Ca, Cr, Y, Mg;
- M' is selected from Fe, Ni, Cr, Co, Mo, W;
- x, y and z represent the atomic percentages of each of said elements E, M, M';
  - where
  - $x \neq 0$
  - $y \neq 0$
  - and $z=0$ or $z \neq 0$, given that:
    - if E=M=Cr, then $z \neq 0$ and M'$\neq$Cr;
    - if E=Ti, Zr, Hf, Ta or Nb and M=Cr, then $z \neq 0$ and M'$\neq$Cr, as a pack for the thermochemical treatment, in a halogenated atmosphere of a carbon-containing material optionally with an open porosity.

The use of alloys of this type (in a divided form: powders, granules, pieces, etc.) as packs in cementation methods carried out in a halogenated atmosphere, is novel. Said use under the general and advantageous conditions described above can produce surprising results in particular with highly porous materials.

The various aspects of the invention are illustrated in the following examples.

EXAMPLE 1

Thermochemical treatment outside the pack, generating zirconium carbide layers on three-dimensional (3D) fibrous carbon preforms with 75% porosity.

A mixture of aluminium and zirconium powders was placed in a semi-sealed stainless steel chamber in proportions of 38.2 atomic % (15.5% by weight) of Al and 61.8 atomic % (84.5% by weight) of Zr to which an aluminium fluoride AlF$_3$ powder was added in an amount of 5% by weight of the charge. The ensemble was heated to 927° C. (1200 K) at atmospheric pressure maintained by a stream of hydrogen, for 36 hours. At the end of this treatment, an alloy (or pack), of aluminium-zirconium with a composition of 38.2 atomic % of Al and 61.8 atomic % of Zr was obtained which was in the form of a mixture of porous granules and powders; the aluminium fluoride had been completely displaced towards the coldest wall in the semi-sealed chamber where it had re-condensed.

A portion of said Al—Zr alloy was removed and introduced into the same semi-sealed chamber into the portion which became the hottest portion. A 3D fibrous carbon 20×15×5 mm³ preform with 75% porosity was suspended above the pack with no contact with the latter. The ensemble was placed in the middle portion of a jacketed tube furnace and heated to a temperature of 827° C. (1100 K) so that there was a difference of 100° C. between the hottest temperature where the part to be treated and the Al—Zr pack were located and the coldest temperature where the solid AlF$_3$ was located. Under these conditions, the theoretical activities of the aluminium and zirconium in the alloy were $a_{Al}=1.3\times10^{-4}$ and $a_{Zr}=3.3\times10^{-1}$. A 16 hour treatment at a total pressure of 2.67 kPa maintained by a stream of helium was carried out. At the end of this treatment, an adherent zirconium carbide coating with a highly regular morphology had been produced on all of the fibers constituting the preform. Its thickness varied from 110 nanometers (nm) to 100 nm between the exterior and the center of the part.

EXAMPLE 2

Thermochemical treatment outside the pack, generating zirconium carbide layers on carbon/carbon composites with 10–15% porosity.

An Al—Zr alloy was produced in the presence of an activating compound AlF$_3$ under the same conditions as those described for Example 1. In this instance, the composition of the powder mixture was 45.8 atomic % (20% by weight) of Al and 54.2 atomic % (80% by weight) of Zr.

A carbon/carbon composite part 20×15×5 mm³ with 10% to 15% porosity was suspended above the prepared alloy (with no contact with the latter) and treatment was carried out at 927° C. (1200 K) for a period of 100 hours. Under these conditions, the theoretical activities of the aluminium and zirconium in the alloy were $a_{Al}=8.8\times10^{-3}$ and $a_{Zr}=2.9\times10^{-2}$. The total pressure was 2.67 kPa, maintained by a stream of helium. The temperature difference between the treatment zone and the zone where the AlF$_3$ activating compound was solid was 50° C. The thickness of the zirconium carbide coating obtained, which was adherent and had a highly regular morphology, varied from 2.9 μm to 1.8 μm between the exterior and the center of the part.

EXAMPLE 3

Thermochemical treatment outside the pack, generating layers of tantalum carbide on three-dimensional (3D) fibrous carbon preforms with 75% porosity—High temperature diffusion treatment generating mono-phase tantalum carbide coatings on three-dimensional fibrous carbon preforms with 75% porosity.

a) The following were simultaneously introduced into a semi-sealed stainless steel chamber:
  - into the portion which would have the hottest temperature, a mixture of chromium and tantalum powders in proportions of 28 atomic % (10% by weight) of Cr and 72 atomic % (90% by weight) of Ta;
  - into the portion which would have the coldest temperature, a chromium fluoride CrF$_2$ powder (5% by weight of the Cr—Ta mixture) carried in a graphite boat.

In a first operation, the ensemble was heated to a temperature of 777° C. (1050 K) in the hot zone and 727° C. (1000 K) in the cold zone, at a total pressure of 3 kPa maintained by a stream of hydrogen around the semi-sealed chamber, for 36 hours.

The alloy obtained (or, in a variation, the pure powdered metals in the same proportions) was used to treat a 3D fibrous carbon preform part of 20×5'5 mm³ with 75% porosity suspended above the powder mixture without contact with the latter.

The ensemble was introduced into the middle portion of a jacketed tube furnace at a temperature of 777° C. (1050 K) such that there was a difference of 50° C. between the hottest temperature where the part to be treated and the Cr—Ta pack (or in a variation, the powder mixture) were located and the coldest temperature where the solid $CrF_2$ was located. Under these conditions, the theoretical activities of the chromium and tantalum in the pack were $a_{Cr}=2.3\times10^{-1}$ and $a_{Ta}=9.9\times10^{-1}$. The treatment was carried out at a total pressure of 2.67 kPa maintained by a stream of hydrogen, for a period of 8 hours. At the end of this treatment, an adherent two-phase $TaC+Ta_2C$ coating with a highly regular morphology had been produced on all of the fibers constituting the preform. It was of the order of 20 nm thick; its uniformity was over 90% (said uniformity was the ratio, expressed in %, between the thickness of the coating in the central zone of the preform and the thickness of the coating at the external surface of the preform).

b) The part coated in accordance with Example 3a was introduced into a semi-sealed graphite chamber which had not been used to carry out any cementation treatment; the part was also carried by a graphite tool. The ensemble was maintained at a temperature of 1300° C. (1573 K) for 48 hours at atmospheric pressure maintained by a stream of helium. At the end of this treatment, a mono-phase TaC coating was obtained which retained the thickness, uniformity, adherence and regular morphology of the two-phase $TAC+Ta_2C$ coatings obtained in Example 3a.

EXAMPLE 4

Thermochemical treatment outside the pack, using a $MgF_2$ activating compound and generating layers of boron carbide on three-dimensional (3D) fibrous carbon preforms with 60% porosity.

The following were simultaneously introduced into a semi-sealed graphite chamber:

into the portion which would have the hottest temperature, a mixture of boron and magnesium powders in proportions of 95.3 atomic % (90% by weight) of B and 4.7 atomic % (10% by weight) of Mg, and a 3D fibrous carbon preform part of $15\times10\times5$ mm$^3$ with about 60% porosity, suspended above the mixture of powders by a graphite tool so that there was no contact between the two items:

in the portion which would have the coldest temperature, magnesium fluoride $MgF_2$ crystals (20% by weight of B—Mg mixture) carried in a graphite boat.

The ensemble was introduced into the middle portion of a jacketed tube furnace at a temperature of 227° C. (1500 K) such that there was a difference of 70° C. between the hottest temperature where the part to be treated was located and the coldest temperature where the solid $MgF_2$ was located. The treatment was carried out at a total pressure of 1.33 kPa maintained by a stream of hydrogen, for a period of 18 hours. A Mg—B alloy was formed as the temperature in the furnace rose, by melting of the magnesium from 650° C. (923 K). Under these conditions, the theoretical activity of the boron was maintained at 1 and the activity of the magnesium was less than about $10^{-2}$. At the end of this treatment, an adherent rhombohedral boron carbide coating with a regular morphology had been produced on all of the fibers constituting the preform; its thickness varied from 140 nm to 85 nm between the exterior and the center of the part.

EXAMPLE 5

Thermochemical treatment carried out in the pack, generating layers of boron carbide on carbon/carbon composites with 10–15% porosity.

The composition of the B—Mg powder mixture and its disposition with respect to the solid activating compound $MgF_2$ were the same as in Example 4. The part to be treated was a carbon/carbon composite of $25\times8\times20$ mm$^3$ with 10% to 15% porosity; it was placed inside the powder mixture. The thermochemical treatment was carried out under the same conditions as those of Example 4, the duration being increased to 32 hours and with a total pressure of 0.67 kPa. At the end of this treatment, the part was extracted from the pack and was easily freed from the residues thereof using a brush with flexible bristles of a synthetic material. For this "cleaning", there was no need to carry out an expensive operation such as machining since the pack did not adhere to the treated part.

An adherent rhombohedral boron carbide coating with a relatively regular morphology had been produced over all of the porous portions accessible to the gas phase. Its thickness varied from 1 μm to 0.5 μm between the exterior and the center of the part.

What is claimed is:

1. Use of an alloy with formula:

$$xE\text{-}yM\text{-}zM'$$

where:

E is selected from Ti, Zr, Hf, Ta, Nb, Cr, Si, B and alloys thereof;

M is selected from Al, Ca, Cr, Y, Mg;

M' is selected from Fe, Ni, Cr, Co, Mo, W;

x, y and z represent the atomic percentages of each of said elements E, M, M';

where $x\neq0$ $y\neq0$ and $z=0$ or $z\neq0$, provided that:

if E=M=Cr, then $z\neq0$ and M'≠Cr;

if E=Ti, Zr, Hf, Ta or Nb and M=Cr, then $z\neq0$ and M'≠Cr, as a pack for the thermochemical treatment, at a reduced pressure, in the range 0.1 kPa to 30 kPa of hydrogen, a rare gas or a mixture of these gases, in a halogenated atmosphere, of a carbon-containing material optionally having an open porosity.

2. Use of the alloy of claim 1 as a pack for the thermochemical treatment, in a halogenated atmosphere, of a carbon-containing material optionally having an open porosity, said treatment comprising maintaining said material:

a) at a temperature in the range 700° C. to 1300° C.;

b) at a reduced pressure, in the range of 0.1 kPa to 30 kPa of hydrogen, a rare gas or a mixture of these gases;

said treatment also being in the presence of a solid activating compound having vapor pressure at said treatment temperature lower than said reduced pressure, with formula $MX_n$, where X consists of chlorine or fluorine.

3. Use of the alloy of claim 2, wherein said carbon-containing material has an open porosity in the range of 2% to 98%.

4. Use of the alloy of claim 3, wherein said carbon-containing material consists of a graphite part, a completely or partially densified carbon/carbon composite, a non densified fibrous carbon preform, a non densified preform based on SiC fibers pre-treated or non pre-treated to produce a superficial carbon layer, or a carbon foam.

5. Use of the alloy of claim 2, wherein said carbon-containing material is at least partially immersed in said pack or maintained in the gas phase, in a zone near to said pack.

6. The use of the alloy of claim 2, wherein said solid activating compound is in contact neither with said pack nor with the treated carbon-containing material.

7. The use of the alloy of claim 6, wherein said solid activating compound is maintained at a temperature which is 20° C. to 200° C. lower than the temperature of said treated carbon-containing material.

8. The use of the alloy of claim 2, wherein said thermochemical treatment is carried out:

at a temperature of less than 1050° C.;

at a reduced pressure of helium or argon;

in the presence of a donor Zr—Al pack and an $AlF_3$ activating compound, to generate a zirconium carbide coating.

9. The use of the alloy of claim 2, wherein said thermochemical treatment is carried out:

at a temperature of less than 1050° C.;

at a reduced pressure of hydrogen;

in the presence of a donor Ta—Cr and an $CrF_3$ activating compound, to generate a two-phase $TaC+Ta_2C$ coating.

10. The use of the alloy of claim 9, wherein said thermochemical treatment comprises an additional annealing heat treatment, carried out at a temperature close to 1300° C., to generate a mono-phase TaC coating.

11. The use of the alloy of claim 2, wherein said treatment is carried out:

at a temperature of less than 1100° C.;

at a reduced pressure of hydrogen;

in the presence of a donor B—Mg or B—Y pack and an $MgF_2$ or $YF_3$ activating compound, to generate a boron carbide coating.

* * * * *

UNITED STATES PATENT AND TRADEMARK OFFICE
CERTIFICATE OF CORRECTION

PATENT NO. : 6,413,585 B1
DATED : July 2, 2002
INVENTOR(S) : Yves Madec et al.

It is certified that error appears in the above-identified patent and that said Letters Patent is hereby corrected as shown below:

Column 10,
Line 60, "20x5'5" should read -- 20x5x5 --;

Column 11,
Line 23, "TAC" should read -- TaC --; and
Line 46, "⌊227ºC" should read -- 1227ºC --.

Signed and Sealed this

Thirteenth Day of May, 2003

JAMES E. ROGAN
*Director of the United States Patent and Trademark Office*